(12) United States Patent
Nogueroles Viñes et al.

(10) Patent No.: US 6,735,866 B2
(45) Date of Patent: May 18, 2004

(54) METHOD FOR MANUFACTURING ELEMENTS OF COMPOSITE MATERIALS BY THE CO-BONDING TECHNIQUE

(75) Inventors: Pedro Nogueroles Viñes, Madrid (ES); Aquilino Garcia Garcia, Madrid (ES); Carlos Cerezo Pancorbo, Madrid (ES)

(73) Assignee: Airbus Espana, S.L., Madrid (ES)

( * ) Notice: Subject to any disclaimer, the term of this patent is extended or adjusted under 35 U.S.C. 154(b) by 18 days.

(21) Appl. No.: 10/074,269

(22) Filed: Feb. 12, 2002

(65) Prior Publication Data

US 2002/0144401 A1 Oct. 10, 2002

(30) Foreign Application Priority Data

Feb. 13, 2001 (ES) .............................................. 0100317

(51) Int. Cl.$^7$ ............................................... B21D 53/88
(52) U.S. Cl. .................. 29/897.2; 29/897.32; 29/419.1; 29/448; 29/458; 29/462; 29/527.2; 244/126
(58) Field of Search ................. 29/897, 897.2, 29/897.3, 897.32, 897.35, 419.1, 424, 447, 448, 458, 462, 527.1, 527.2, 469, 469.5; 156/245, 242, 285; 264/511, 571, 152, 258, 241, 263, 294, 319; 244/123, 124, 125, 126; 52/793.1; 428/292.1, 33, 293.4, 98, 297.1, 193, 300.7, 44, 45–57, 119–130

(56) References Cited

U.S. PATENT DOCUMENTS 4,411,380 A * 10/1983 McWithey et al. ......... 228/181
4,502,200 A * 3/1985 Anderson et al. ......... 29/525.04
5,850,722 A * 12/1998 Yasui ....................... 52/793.11
5,866,272 A * 2/1999 Westre et al. ............... 428/593
6,279,228 B1 * 8/2001 Kobayashi et al. ...... 29/889.72

* cited by examiner

Primary Examiner—Charles T. Jordan
Assistant Examiner—Trinh Nguyen
(74) Attorney, Agent, or Firm—Ladas & Parry

(57) ABSTRACT

Method for manufacturing elements made from composite material using the co-bonding technique, in which uncured elements (preformed beams (2)) are bonded onto another cured element (the skin (3)) with multiple thickness changes, using a rigid tooling made of invar used for support and positioning during the curing process. Each element is made with preimpregnated material using automated tape laying. The preform of the beams (J-section) is obtained by hot forming of flat laminates. The final curing and bonding to the precured skin (co-bonding) is performed using a direct vacuum bag in an autoclave. A flat development of the vacuum bag is performed, it is traced with a numerical control machine and it is made prior to being placed on the tool. For large surfaces with difficult access the final adjustment is performed with the tool and the part in a vertical position, due to the ergonomic difficulties involved in working on certain areas of same. The invention is applicable to the field of aeronautics.

20 Claims, 8 Drawing Sheets

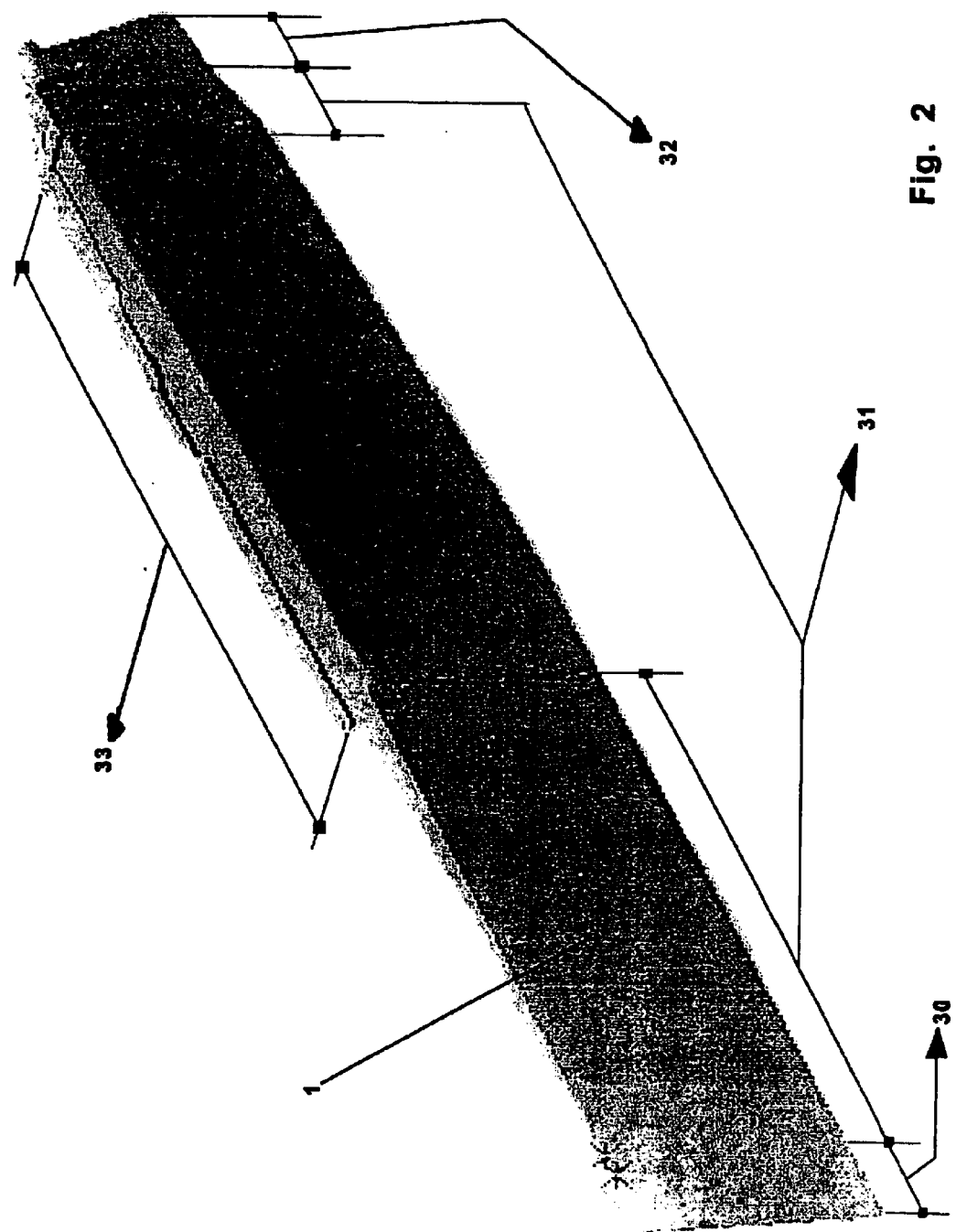

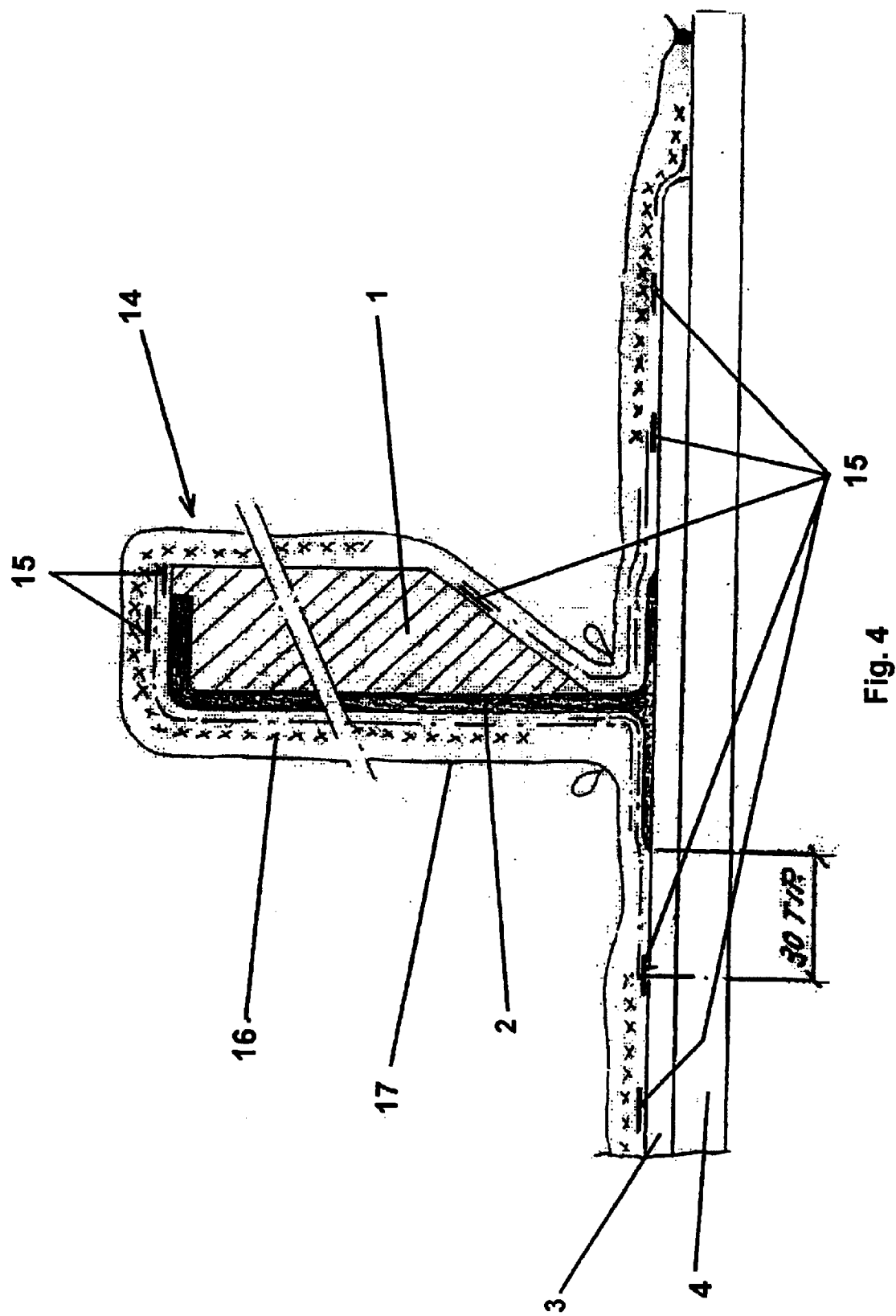

METHOD FOR MANUFACTURING ELEMENTS OF COMPOSITE MATERIALS BY THE CO-BONDING TECHNIQUE

FIELD OF THE INVENTION

The present invention relates in general to methods for manufacturing a composite material structure, in which on a precured element (skin) are glued other uncured elements (beams) by placing an adhesive layer between them (between the precured element and each uncured element), thereby obtaining a structural union. The adhesive is cured at the same time as the latter elements.

More specifically, the object of the invention is to develop the required theoretical concepts and the corresponding manufacturing methods for providing a union system by co-bonding of one or several elements (beams) made from composite materials and uncured, and a base (skin) also made of composite material but which is precured, with multiple changes in thickness. A precise adjustment must be obtained of the uncured elements, both with the adhesive surface (skin) and with the other, upper surface.

For this purpose, the tooling used is the most relevant factor, which is in this case a rigid invar rod (described in detail below) with a direct bag that allows to obtain a high dimensional precision at the same time as a tight positioning tolerance. To clarify the term "direct bag", it should be pointed out that the direct vacuum bag concept relates to the fact that the elements comprising the vacuum bag (FEP or fluoro-ethylene-propylene, AIRWEAVE type aerator and bag plastic) are directly on the part to be cured without any interposed tooling. This ensures a uniform consolidating pressure.

The union is achieved by curing the adhesive layer under strict pressure conditions and at its polymerization temperature, which must match that of the resin of the uncured elements as both chemical processes take place simultaneously in the same autoclave cycle.

Likewise, the union effected is designed to withstand shear loads applied to the skin by the beams, due to deflections of the structure, and detachment forces applied on the beams by the skins, as well as various types of internal pressures such as those of a fluid when the torsion box is the fuel tank.

BACKGROUND OF THE INVENTION

The most remarkable characteristic of the present invention is the use of a rigid tooling (a system of rigid tools and rakes) for the bonded union, combined with applying autoclave pressure using a scheme with a vacuum bag in direct contact with the elements to be bonded and cured.

In order to bond the uncured elements to a precured skin which must match another complex surface at the unbonded end, a manufacturing system was initially developed with a flexible tooling using the "inflatable tool" technique. These tools were made from an elastomer material stiffened as required with carbon fiber.

The high cost and low reliability of this tooling spurred the development of a rigid tooling system to solve these problems; this is the co-bonding system with rigid tools.

During the development stage of the rigid tooling trials were performed with tools of various configurations:

Several configurations were tested with steel material, which were discarded because of the thermal gradients generated which resulted in deformations of the part to the point of not obtaining the required quality.

Two constructive solutions have been tested using invar:
Rigid tools made from welded sheets which are later machined. This solution is the lightest but its construction is extremely complex and involves several deformation and straightening operations during fabrication.

It is also possible to leave a small wall thickness after machining, with the resulting risk of collapse of the tool in the autoclave. The resulting weight does not allow manual handling.

Rigid tools made from a sheet with a sufficient thickness and enlightened by machining, and later covered by a welded plate.

The enlightened material weighs ≈25 kg as compared to a weight of the solid tool of around 150 kg. This enlightening is not justified due to handling issues as it greatly increases the tool fabrication cycle and its handling still requires additional means.

As well as the use of different materials and configurations of the rigid tools, another basic aspect in the use of this type of blade-shaped rigid tooling is the distance between the edge of the rigid tool and the radius of the beam foot. The following configurations were tested:

The rigid tool extending 2 mm into the radius.

The rigid tool remaining 2 mm above the radius.

The rigid tool extending as far as the middle of the radius.

It was concluded that the rigid tool should end above the radius of the foot, as this configuration provides the best dimensional and quality results, as well as facilitates demolding.

Later studies led to an optimization of the distance between the rigid tool and the beam foot radius, arriving at the conclusion that the ideal distance was 3 mm from the edge of the rigid tool to the start of the beam foot radius.

The results obtained indicate that rigid tools should be made of solid invar, as this simplifies their construction and improves dimensional tolerance. Additionally, they are handled in all cases with auxiliary means and not manually, regardless of their configuration.

As regards the bonded unions, using a different type of tooling, the prior art closest to the application are those relating to:

1. Joining beam stiffeners of the torsion box for the A330-340 airplane horizontal stabilizer (currently in the production stage).
2. Joining the longitudinal stiffeners for the skin of the torsion box of the CASA 3000 airplane wing (in prototype stage).
3. Joining auxiliary longitudinal beams to the skin of the torsion box of test FB.5-1 of the technological development program for large airfoils (GSS) to be applied to the horizontal stabilizer of the A3XX.

From the results of the above experiences and from other relevant manufacturing studies and tests it was concluded that the application of the method of the present invention is feasible and reliable for its use in parts of highly demanded withstanding structures and with high quality requirements, with complex shapes and strict dimensional tolerances.

FIELD OF APPLICATION OF THE INVENTION

This invention is applicable to the manufacture of structures made of composite materials in which participate a precured element (skin) and other uncured elements (beams) that are cured simultaneously to their union to the precured element.

The structures for which this technique would be applicable are such as:

Airplane structures and controls, such as airfoils, moving airfoil surfaces, fuselages.

Space ships

Marine and land vehicles

Industrial machinery and equipment.

The various manufacturing stages which comprise the full process are:

Fabrication of the Skin

Tape laying on a curved tool.

Placing the vacuum bag on a laminate.

Curing in an autoclave.

There is no demolding operation nor a non-destruction inspection.

Fabrication of the J-beams

Flat tape laying.

2D cutting in fresh state on patterns.

Mounting patterns until final configuration of the beam cloths.

A first hot forming cycle to obtain two L-shaped beam halves.

Placing one half on the other.

A second hot-forming cycle, to provide the final J-shaped beam.

3D cutting of the uncured beam rises as well as other cutting to obtain the final size of the beam after the curing cycle.

Fabrication of the Vacuum Bag

Approximate flat layout of the final bag configuration.

Tracing the bag in a flat machine with numerical control or manually with jigs or Mylar. The position of the beams and fasteners on the radii is traced.

Formation and manual attachment of the fasteners.

Fabrication of the Final Structure: Co-bonding

Assembling the beams on rigid invar tools on auxiliary preassembly benches. Each bench has two rigid tools to allow ergonomic working conditions.

Placing all possible elements of the final vacuum bag on the beams in the preassembly benches. Additionally, a consolidation is carried out to ensure adjustment on the skin. For this, the preassembly benches are provided with a surface which perfectly resembles the surface of the skin.

Transfer of rigid tools+rakes+beams to their final position on the skin.

Placing the remaining elements of the vacuum bag.

Assembling the prefabricated and checked vacuum bag.

Final adjustment of the vacuum bag with the assembly in a vertical position for large surfaces with difficult access to certain areas.

Autoclave curing cycle.

Demolding.

Non-destructive inspection of the skin.

Re-edging (only for the skin as the system of rigid tools allows to obtain beams with their final geometry).

Non-destructive inspection of beams.

Priming and painting.

Materials

The materials to be used will be composite materials, in which the fibers and resin can be:

Fibers

Carbon fiber.

Glass fiber.

Ceramic fiber.

Aramid fiber.

Boron fiber.

Resins

Epoxy resin.

Thermoplastic resin.

Other thermosetting resins.

SUMMARY OF THE INVENTION

The object of the invention is a method for manufacturing composite material structures in which several uncured elements (beams) are joined to a precured element (skin) so that the union has structural requirements.

The bonding and curing of the beams is achieved by a prior forming and a final curing in an autoclave with a direct vacuum bag.

The uncured elements have a J-shaped cross section.

The basis of the manufacturing method is the optimized design of forming tools (made of aluminum and improved wood with an integrated vacuum system for overturning) and particularly curing in an autoclave, rigid tools made of invar (to avoid deformations due to thermal expansion) and the automation of all processes.

The method is applicable to any base structure which must be stiffened by elements with a precise geometry.

The tape laying technique can be either manual or automated, although the automated tape laying system optimizes the process considerably.

In a specific embodiment the invention discloses a method for manufacturing precured parts of composite material by using uncured J-beams, in which are structurally joined at least two parts made of composite materials, of which a first part known as the base part or skin is in a cured state and a second part or parts, known as beams, are uncured, and in which the two parts are joined by a layer of structural adhesive so that the second part is compacted against the first, with a suitable cross linking of the resin of the composite material, and so strongly bonded to the skin of the first part that the required strength of the adhesive layer is ensured. This method is characterized by the following stages: laminating superposed layers of preimpregnated composite material so that the fiber orientation is adapted to the structural requirements of the part to be obtained, obtaining from the resulting laminates on one hand the base part and on another a set of basic stacks used to form the second part; curing the base part in an autoclave; cutting the flat laminate with the areas of different thickness from which the second parts are obtained; assembling packages from the patterns obtained in the previous cutting; hot forming in two cycles, by applying heat and vacuum, of the previously obtained flat configurations to obtain a preform with a J-shaped cross-section; mounting the preforms on the curing tools on auxiliary preassembly benches which simplify this task; precise positioning of all tooling (rigid tools+rakes) and J-shaped parts on the precured base; mounting a previously made and checked vacuum bag; overturning the part and the tool to a vertical position when the parts have a large area and are difficult to access, in which position the fine adjustment of the vacuum bag is performed; and performing the autoclave curing cycle.

In accordance with the invention a base part and one or more second parts are joined to obtain a finished precured part. The uncured elements to be bonded are obtained from flat laminates of varying thicknesses in some areas, which are later cut and stacked in packages until the final configuration of the part, with packages of at least two cloths being stacked and in no case with two cloths touching each other.

Likewise, the uncured elements to be bonded are hot formed to obtain preforms with the final geometry, so that they can be easily mounted on the curing tools (rigid tools). The hot forming tools are made of aluminum with improved wood on their top part, which is in contact with the fiber, in order to prevent heat transfer losses as well as in the integrated vacuum system for overturning said tools.

In addition, the curing tools generally have a rectangular trapezoid cross-section so that the geometrical quality of the part is ensured, allowing to adjust the beams on their top surface with another part of the type of the base part. These curing tools are made of invar to prevent deformations due to thermal expansion during the autoclave cycle.

Furthermore, between the edge of the rigid tool and the foot radius of the beam there is a 3 mm separation which ensures the geometrical quality of the part as well as facilitates the demolding; the autoclave curing process is performed at a pressure between 585 kPa and 896 kPa, and at a temperature of up to 190° C. depending on the composite material used, with a heating gradient of 0.5 to 2° C./min.

With the method of the invention parts are obtained that can be applied in structures and controls of aerospace, marine and land vehicles, as well as in industrial machinery and equipment. Specifically, the base part (skin) comprises the skin of an airplane wing, a stabilizer or any other element which must be stiffened to fulfill its structural functions.

In accordance with the invention, the uncured parts have a J-shaped cross section and thickness between 1 and 6 mm, while the base part has a length of up to 7 m and is shaped as a delta.

The vacuum bag used in the method of the invention is quite large, so that it is traced with a numerical control machine and made before it is placed.

The composite material used in the method of the invention consists of fibers and resins selected among glass fiber, carbon fiber, aramid fiber, boron fiber, epoxy resin, thermoplastic resin and other thermosetting resins.

BRIEF DESCRIPTION OF THE DRAWINGS

The above and further characteristics and advantages of the invention will become apparent by means of the following description made with reference to the accompanying drawings, where:

FIG. 2 is a perspective view of a rigid invar tool used in the method of the invention.

FIG. 4 shows the rigid tool of FIG. 2 and a J-beam attached to it enclosed in a direct vacuum bag.

DETAILED DESCRIPTION OF THE INVENTION

Figure 1:
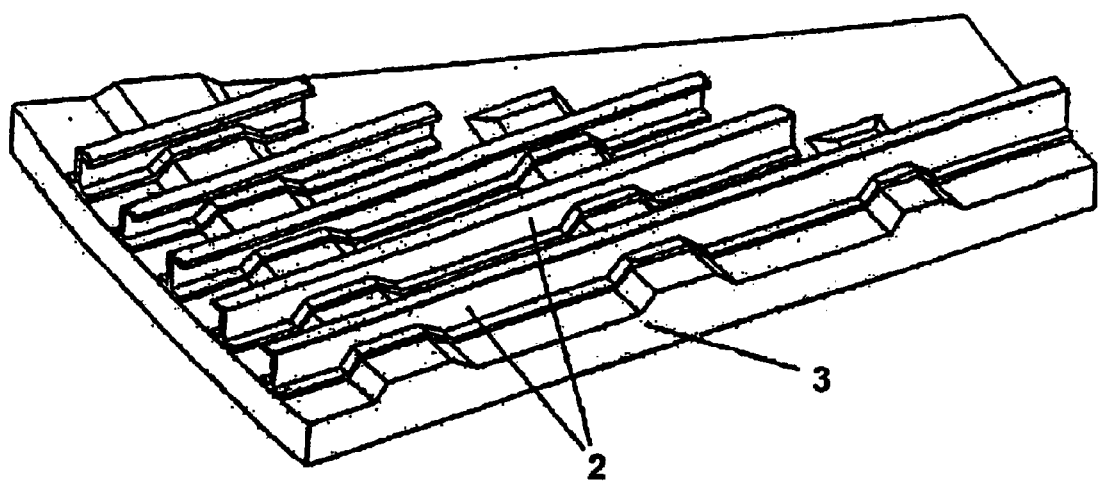
FIG. 1 is a perspective view of a structure made of composite material obtained by the method of the invention.
Figure 3:
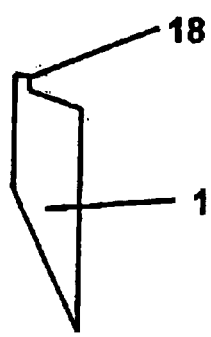
FIG. 3 is a typical cross section of a rigid invar tool such as that of FIG. 2.

The manufacturing method of the invention applicable to composite materials is associated to a set of various prior processes which allow an optimized co-bonding.

The basis of the success of the method is the tooling used. The method and system of rigid tooling, rigid tools (1), has been specifically conceived for peculiar geometries in which the J-section beams (2) must be bonded to a skin (3) with multiple thickness variations, and where the beams must match well another surface on the upper side thereof.

As the beams (2) must maintain a given height with a tight tolerance the rigid tools (1) must be completely still during the curing cycle, without exerting any compacting pressure against the beam foot, which makes the process even more complicated.

Fabrication of the Skin

The base skin is made by automatic tape laying (ATL), although the tape can also be placed manually, in both cases using unidirectional tape with a 150 mm band width. A relatively low width is used to allow laminating considerably curved surfaces with large local differences in thickness, due to the local application of structure loads in its service lifetime.

To prevent the problems with the different thermal expansion between the tool (4) and the material used (carbon fiber tape) an invar tool is used, as this material has a thermal stability which is quite similar to the carbon fiber laminates.

The curing cycle is performed at a high pressure (896 kPa) to ensure that no pores appear inside the element. Without demolding the skin (3) from the tool (4), the co-bonding operation of the beams (2) is performed after their preform is obtained.

Fabrication of the J-Beams

The J-beams (2) are made using the package technique in order to maximize the automation of their manufacture.

In order to avoid having to place the cloths one by one, a flat laminate is automatically tape-laid with the correct orientations and different thickness that vary from 0.5 mm (2 layers of carbon fiber tape) to 1.75 mm (7 layers of carbon fiber tape). Flat tape laying is with unidirectional tape with a 300 mm width to shorten machine use times (or manual tape laying times).

This laminate is taken to the panex 2D cutting machine (for uncured cutting), from which the patterns are obtained that will be part of each beam (2) (the term "panex" refers to an uncured stack of carbon fiber tape and/or fabric). Before hot forming the packages are mounted until the required cloth sequence is obtained. Some of the mounted patterns are full for the entire part and others are local reinforcements for certain areas.

Figure 6:
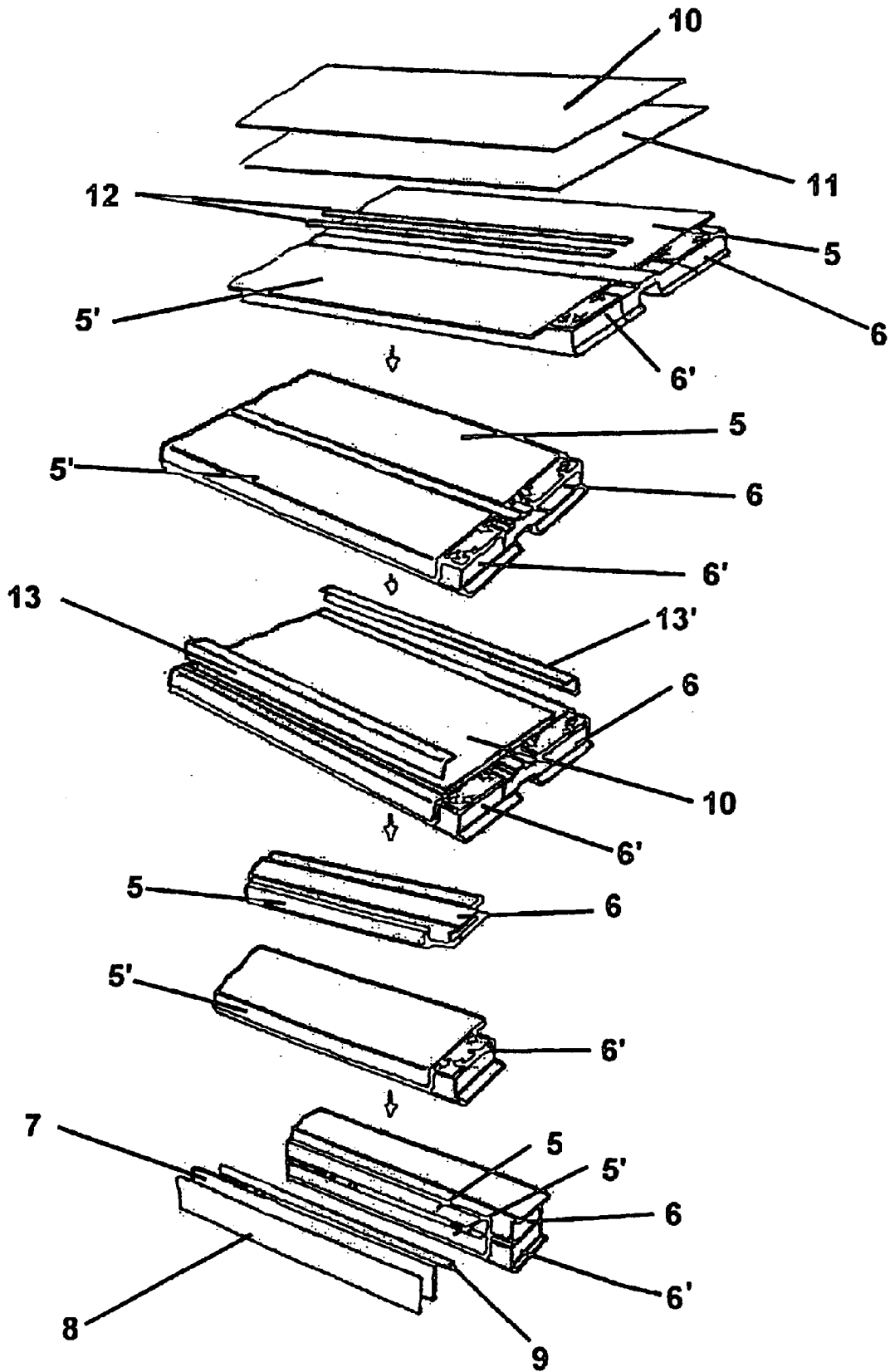
FIG. 6 shows the successive steps of the manufacture of a preform for a J-beam in accordance with the method of the invention.
Figure 7:
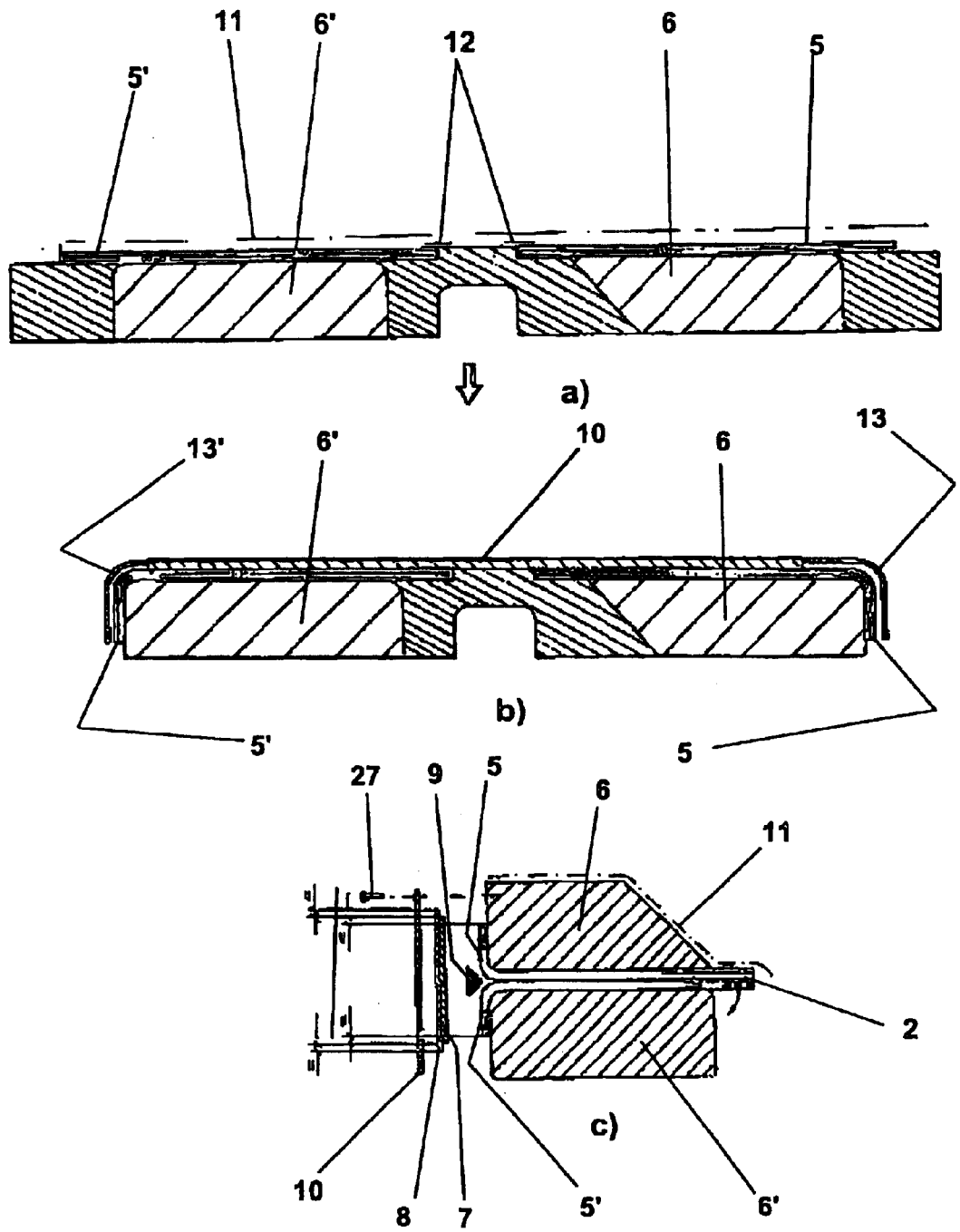
FIG. 7*a–c* shows enlarged sectional views of the two hot forming tools used in the manufacturing method illustrated in FIG. 6.

The preform of the J-beam (2) is obtained by two hot forming cycles shown in FIGS. 6 and 7.

In the first cycle the foot (5, 5') of each half of the beam (2) is bent to obtain two L's. The tool (6) is laid on the tool (6'), with the laminate held onto the tool by the integrated tool vacuum system. An end strip (7) of carbon fiber (2 layers) and a layer of adhesive (8) are placed on the foot of the beam, without removing the support paper to prevent the beam from adhering on the preassembly benches as explained further below.

The central gap left in the foot between the two halves of the beam is filled with a part (9) of carbon fiber (rowing) with a triangular section and orientations from (+/−) cut by the numerical control machine.

In FIGS. 6 and 7 can also be seen a holder (10), a pin (27) for attaching the former, an FEP sheet (11), two adhesive tapes (12) and two adhesive angles (13, 13').

In the second cycle the final J is obtained by folding the end (the head) of the beam (2) distant from the foot (5, 5').

Stages a) and b) shown in the FIG. 7 correspond to the first cycle described and stage c) of FIG. 7 corresponds to the second cycle described above.

The tools (6, 6') are made of aluminum and improved wood in contact with the laminates in order to minimize the heat transfer from the laminate to the tool. During forming the vacuum must be created slowly (10 mmHg/min) to allow the cloths to slide on each other preventing the appearance of wrinkles at the turning radii. The vacuum is applied when the laminate is at the right temperature (between 45 and 60° C.).

In order to avoid the re-edging operation for beams (2) after they are joined to the skin (3), which is complex due to their final geometry, the longitudinal rises and the head rises are cut when uncured, as well as any orifices or holes in the beam core using a 5-axis 3D numerical control machine. After this operation the beam has its net size.

Vacuum Bag

For large and complex shapes of the vacuum bag (14) (FIG. 4) a bag prefabrication method has been developed which comprises the following stages:

Approximate flat development of the final bag configuration.

Tracing the bag in a 2D numerical control machine or with jigs or Mylar. The position of the beams and fasteners on radii are traced.

Manual creation of fasteners.

Checking the vacuum bag and closing it on itself.

Storage, suitably protecting the plastic until it is used.

For large surfaces an overturning system is used to mount the vacuum bag, with tool (4) taken to a vertical position which allows access to its inside. During the bonding process it is necessary to access the entire surface in an ergonomic manner in order to carry out a thorough adjustment and visual inspection of the complex vacuum bag used, before the autoclave cycle. The adjustment of the bag and tool or bag and part determines the reliability of the bag and the correct shape of the part. For this purpose the entire bag-tool unit is raised to a position which will later allow to rotate it to a vertical position.

The structure of bag (14) consists of a two-sided tape (15), a separator (11), not shown in FIG. 4 and which corresponds to the aforementioned FEP sheet (11), an AIRWEAVE type aerator (16) and an external plastic film (17), such as of nylon.

The abbreviation TIP of FIG. 4 indicates "typical", as applied to a measurement.

Co-Bonding Process

The following basic tooling is used for the co-bonding process:

Rigid tools

Rakes

Preassembly benches

Rigid Tools

These are the main part of the tooling and their adjustment and positioning determines the dimensional quality of the co-bonded part.

Figure 5:
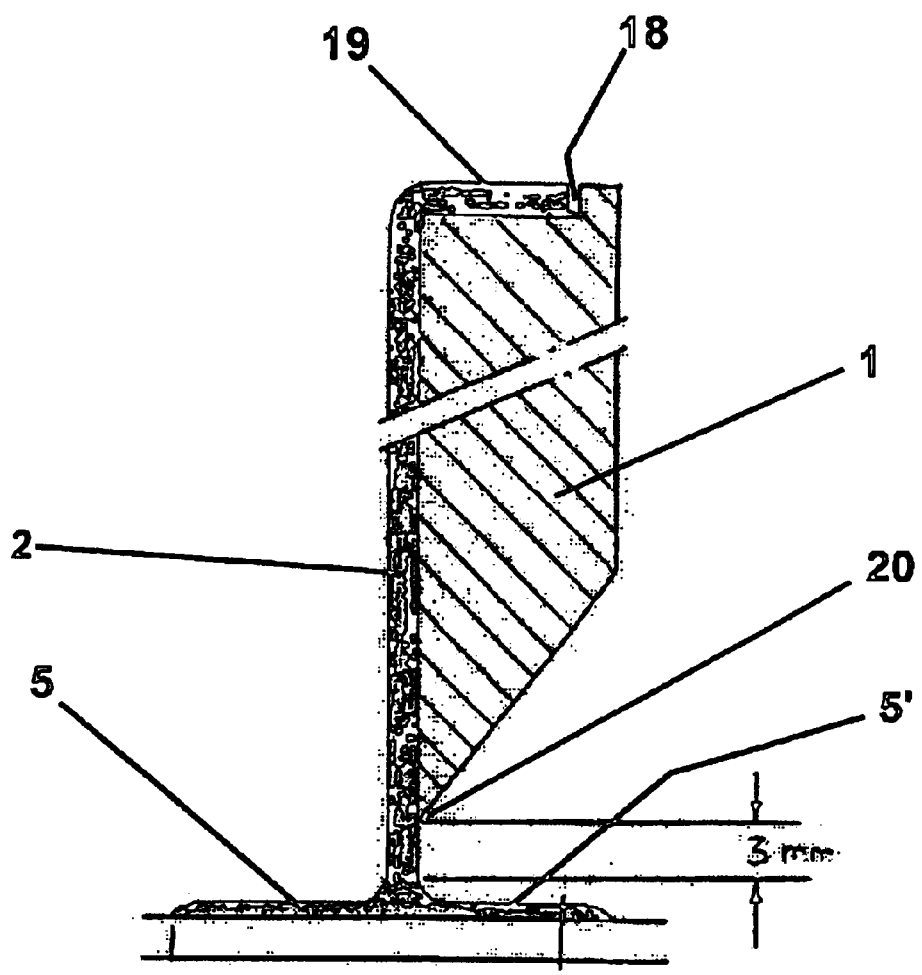
FIG. 5 shows a J-beam attached to a rigid invar tool such as that of FIG. 2.

They are the support and positioning elements for the beams (2) during the curing cycle, and at the same time serve to precisely position each beam. A typical section of a rigid tool (1) is schematically represented in FIG. 5.

The step (18) on the upper part is designed as a stop for the head (19) of the beam (2), although a 1 mm clearance is provided to allow the resin to overflow during the curing process.

In its lower part the profile of the rigid tool (1) ends as a sharp edge (20), for several reasons:

to allow a perfect coupling of the vacuum bag (14) without any bridging of it, which would cause the bag to break or the beam (2) to be deformed in that area;

to prevent resin from overflowing in that area, which would greatly difficult demolding as well as result in deformations of the radius of foot (5, 5') of the beam (2).

The edge (20) ends 3 mm above the start of the radius of the foot (5, 5') in order to allow the demolding operation.

The edge (20) of the rigid tool (1) will accurately follow the shape of the skin (30) with raised and lowered areas due to thickness changes.

With this design for the tool the foot (5, 5') of the beam (2) (the area to be bonded) is subjected to the direct pressure of the autoclave through the vacuum bag (14).

Those areas of the rigid tool (1) where there is no beam (2) are covered by metal elements (28) (fillers) which simulate the thickness and the foot (5, 5') of the beam (2), so that the bag (14) does not slip into the bottom slit which would be left with the resulting risk of breaking same.

As mentioned above, the rigid tools (1) are made of invar in order to prevent the deformation of the beam (2) during the curing cycle as a result of the different thermal expansion of the beam and the rigid tool.

At the longitudinal ends of the rigid tools (1), just at the end of the beam (2), are made grooves (21) for inserting retainers (29) of airpad or Teflon, which can be easily disassembled during demolding and which allow to retain the excess resin from beams (2) during the autoclave cycle.

Rakes

Figure 8:
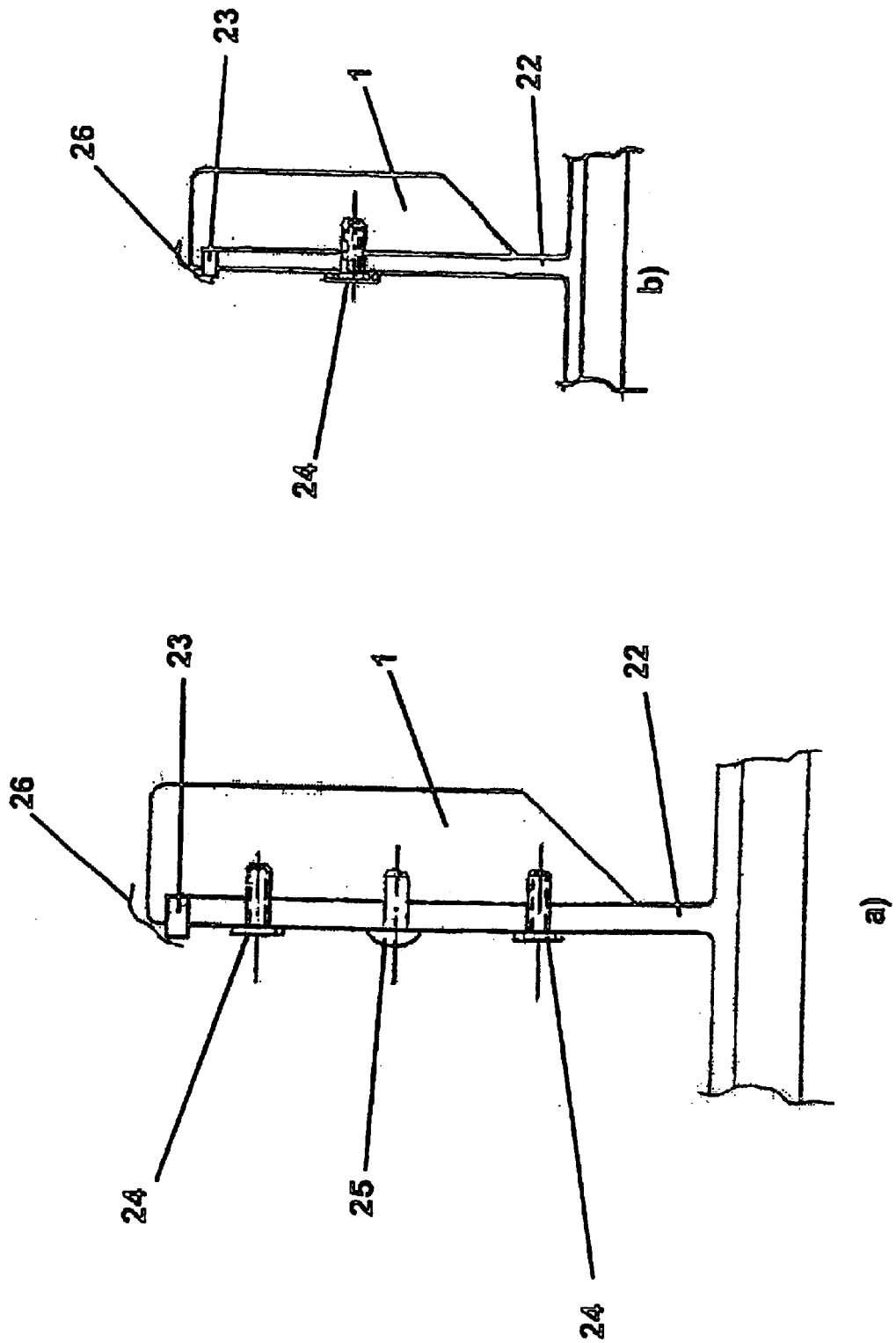
FIG. 8*a–b* shows two methods for attaching a rigid invar member to a support rake.

These are the supporting elements for the rigid tools (1). Some are placed on the tool (4) of the skin (3) and others on the cured skin (3), simply resting on it. Their purpose is to ensure the accuracy in height and verticality of the rigid tools, while also ensuring its longitudinal alignment. A typical scheme for a rake (22) is shown in FIGS. 8a–b, where FIG. 8a shows the attachment of rigid tools to rakes in the section of the engagement of the wing to the fuselage, while FIG. 8b shows the attachment of rigid tools to intermediate and wing tip rakes.

The gaps between the rigid tool (1), rake (22) and skin (3) must be avoided in order to minimize the risk of bag (14) breaking. This is extremely important in the design of the final co-bonding tools.

The vertical support surfaces of the rigid tools (1) are provided with a small cemented plate 2 mm thick to prevent their wear. On these are placed shoes (23) which serve two functions:

to give the rigid tool (1) the correct height to allow the demolding operation, for which with the rigid tool (1) secured in place the shoes (23) are removed and the rigid tool is moved 2 mm towards the skin (3), a sideways motion is effected to release the head (19) of the J part of the beam (2) and finally it is raised to carry it to the corresponding storage cart.

The rigid tools (1) are attached to the rakes (22) by screws (24) and clamps (25) as well as with straps (26).

FIG. 2 shows the cooperation of the rigid tool (1) and the rakes (22) for supporting the beam (2). In this figure the reference (30) represents the area of assembly of the rake on the wing tip, with (31) representing the area of assembly of the fillers (28), (32) representing the area of assembly of the rake in the engagement of the wing to the fuselage and (33) being the area where the beam is housed.

Figure 9:
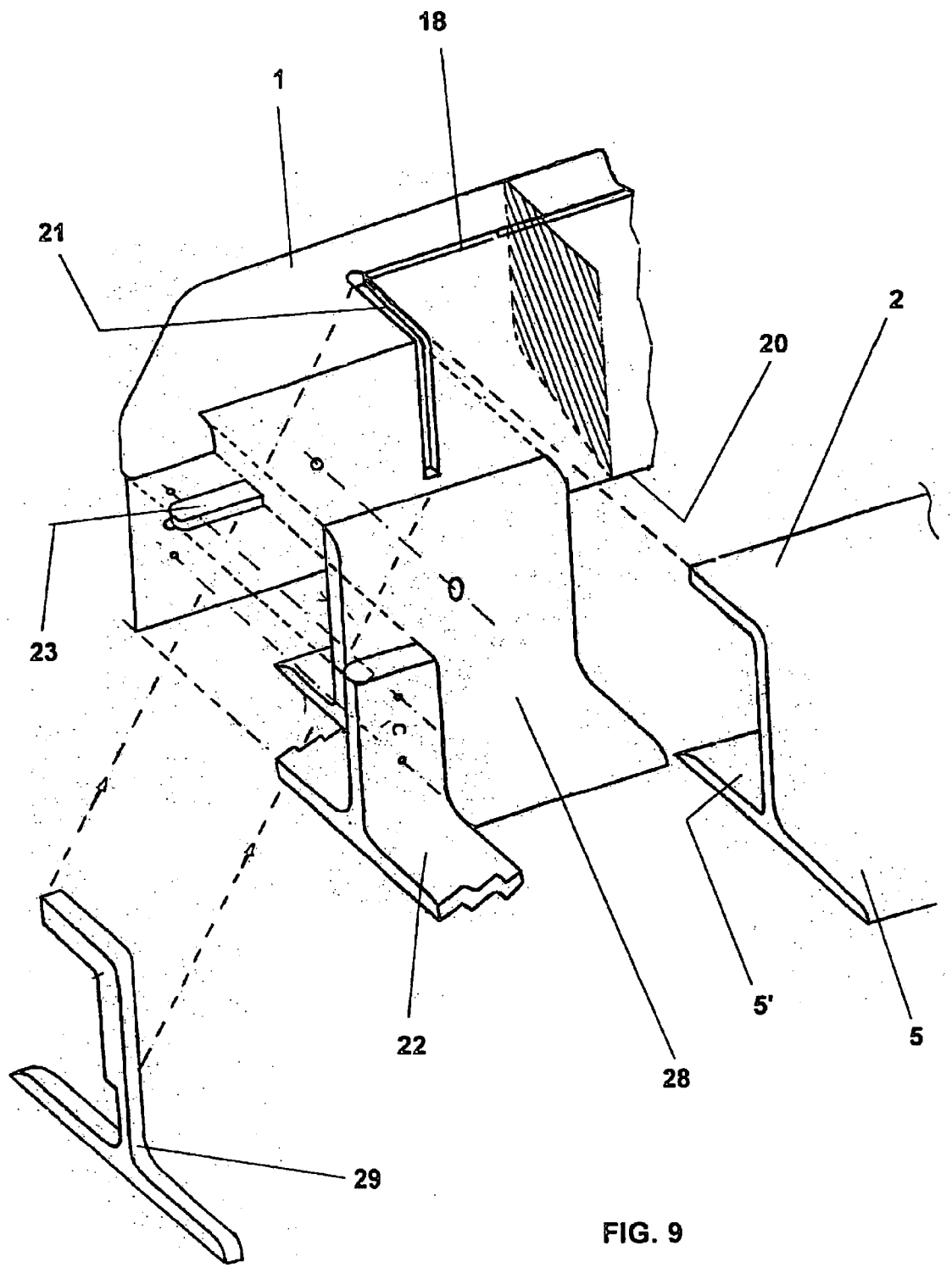
FIG. 9 shows finally a schematic representation of the relative positioning of the various elements required to carry out the method of the invention.

FIG. 9 shows an enlarged view of the relative position of the rigid tool (1), the rake (22), the filler (28), the shoe (23), the retainer (29) and the beam (2), with the shaded area representing a typical cross section of the rigid tool (1).

Preassembly Benches

The assembly of the beams (2) on the skin (3) is performed on auxiliary preassembly benches whose surface reproduces the theoretical surface of the skin. Each of these benches holds two beams with the corresponding rigid tools (1) and rakes (22). This allows an ergonomic working position.

The rakes (22) are mounted on the preassembly bench, the rigid tools (1) are placed on the rakes and then the beam is placed on the rigid tool, where it is consolidated. The foot (5, 5') of the beam includes the adhesive strip with the support paper attached to prevent it from adhering to the bench. Finally, the assembly is transported to the skin (3) where it is precisely positioned.

After the entire tooling and the beams (2) are positioned on the skin (3), the scheme of the vacuum bag (14) is completed by a visual inspection of the full tightness.

For large surfaces, the final adjustment of the bag (14) will be made using the tool and the part in a vertical position.

After the vacuum bag is formed it is inserted in the autoclave for curing and bonding of the beams (2) to the skin (3).

The following operations are summarized below:

Demolding: as explained above.

Automated ultrasound inspection of the skin (3).

Re-edging in a 5-axis numerical control machine.

Automated and manual ultrasound inspection of the beams (2) and the re-edged areas.

Priming and painting.

In the above the essential characteristics of the invention have been described, although it is understood that it would be possible to change certain details of the fabrication method and tooling as developed by the applicant. For this reason it is intended that the scope of the invention be limited only by the contents of the appended claims.

What is claimed is:

1. A method for manufacturing a structure of composite material, said method comprising the steps of
   laminating a first set of superposed layers of resin-impregnated, uncured composite material by automatic tape layout (ATL) to adapt orientation of fibers of the composite material to achieve structural requirements of a precured element,
   curing the laminated first set of superposed layers of resin-impregnated, uncured composite material to form the precured element,
   laminating a second set of superposed layers of resin-impregnated, uncured composite material by automatic tape layout (ATL) to adapt orientation of fibers of the composite material to achieve structural requirements of an uncured element,
   forming the uncured element by cutting the laminated second set of superposed layers of resin-impregnated, uncured composite material in a determined pattern,
   hot forming said uncured element in two steps by applying heat and vacuum to obtain a preform having a J-shaped cross-section,
   mounting said preform on a curing tool,
   positioning said curing tool and said preform on said precured element,
   joining the preform to the precured element with an uncured structural adhesive to form an assembly of the curing tool and the preform on the precured element,
   covering said assembly with a vacuum bag,
   performing an autoclave curing of said assembly to polymerize the resin in said uncured element and said adhesive to obtain a cured element of said J-shaped cross-section bonded to said precured element, and
   removing the curing tool to obtain a structure of composite material formed by said precured element and said cured element of J-shaped cross-section.

2. The method as claimed in claim 1 further comprising mounting a plurality of said preforms having J-shaped cross-sections on a respective curing tool and positioning said curing tools and said plurality of said preform on said precured element to form an assembly of the preform on the precured element by means of the curing tools.

3. The method as claimed in claim 1 wherein said second set of superposed layers of resin-impregnated, uncured composite material is formed as a flat laminate with a varying thickness in different areas.

4. The method as claimed in claim 1 wherein said uncured element is hot formed to obtain the preform of J-shaped cross-section so as to be easily mounted on said curing tool.

5. The method as claimed in claim 1 wherein the step of hot forming said uncured element is effected by a hot forming tool comprising aluminum having wood on a surface thereof to contact said resin-impregnated, uncured composite material in order to prevent heat transfer loss and loss of vacuum in the vacuum bag.

6. The method as claimed in claim 1 wherein said curing tool is formed with an Invar layer to prevent deformations due to a thermal expansion during the autoclave curing of said assembly.

7. The method as claimed in claim 1 wherein said autoclave curing of said assembly is effected at a pressure between 586 kPa and 896 kPa, at a temperature of up to 190° C. depending on said composite material, and with a heating gradient of 0.5 to 2° C./min.

8. The method as claimed in claim 1 wherein said laminated second set of superposed layers of resin-impregnated, uncured composite material is cut in the pattern with a thickness of between 1 mm and 6 mm.

9. The method as claimed in claim 1 wherein said precured element is formed with a length of up to 7 m and with a delta shape.

10. The method as claimed in claim 1 further comprising forming an edge of said vacuum bag in a numerical control machine prior to placing said vacuum bag on said assembly.

11. The method as claimed in claim 1 wherein the composite material comprises glass fiber, carbon fiber, aramid fiber, boron fiber, epoxy resin, thermoplastic resin or thermosetting resin.

12. The method as claimed in claim 1 further comprising performing a fine adjustment of said vacuum bag to said assembly by overturning said assembly to a vertical position.

13. The method as claimed in claim 1 wherein said curing tool has a rectangular trapezoidal profile to allow adjustments in the positioning of said preform.

14. The method as claimed in claim 1, wherein said preform of J-shaped cross-section is formed by the steps comprising:

placing two of the laminated said second set of superposed layers of resin-impregnated, uncured composite material on a respective forming means and bending the two laminates of the second set to form two L-shaped parts, placing the L-shaped parts against one another to form a T-shape cross-section, and bending an end of the T-shaped cross-section to form the J-shaped cross-section.

15. The method as claimed in claim 1 wherein said curing tool has a rectangular trapezoidal cross-section with an edge such that said edge is above a radius of a foot of said preform.

16. The method as claimed in claim 15 further comprising filling a central gap between feet of the two parts with a part of carbon fiber having a triangular cross-section.

17. The method as claimed in claim 16 further comprising attaching a carbon fiber end strip to each foot of the two parts and applying an uncured adhesive on the strip to assist in the bonding of the uncured element to said precured element.

18. The method as claimed in claim 15 wherein said edge is 3 mm from a start of said radius of the foot of said preform.

19. A method of forming an aircraft structure of composite material comprising the steps of forming a skin of the aircraft structure by
laminating a first set of superposed layers of resin-impregnated, uncured composite material by automatic tape layout (ATL) to adapt orientation of fibers of the composite material to achieve structural requirements of the skin, and
curing the laminated first set of superposed layers of resin-impregnated, uncured composite material, laminating a second set of superposed layers of resin-impregnated, uncured composite material by automatic tape layout (ATh) to adapt orientations of fibers of the composite material to achieve structural requirements of beams having J-shaped cross-sections, bending the second set of superposed layers of resin-impregnated, uncured composite material to form the beams having J-shaped cross-sections, securing the beams to the skin with an uncured structural adhesive to form an aircraft structure, and curing said aircraft structure to polymerize the uncured adhesive and the uncured beams.

20. A method for manufacturing a structure of composite material, said method comprising the steps of:

laminating a first set of superposed layers of resin-impregnated, uncured composite material by automatic tape layout (ATL) to adapt orientations of fibers of the composite material to achieve structural requirements of a precured element, curing the laminated first set of superposed layers of resin-impregnated composite material to form the precured element, laminating a second set of superposed layers of resin-impregnated, uncured composite material by automatic tape layout (ATL) to adapt orientations of fibers of the composite material to achieve structural requirements of an preform having a J-shaped cross-section, cutting the thus laminated second set of superposed layers of resin-impregnated, uncured composite material in a determined pattern, bending said laminated second set of superposed layers of resin-impregnated, uncured composite material to obtain the preform having a J-shaped cross-section, mounting said preform on said precured element with an uncured structural adhesive to form an assembly of the preform on the precured element, and curing said assembly to polymerize the resin in said uncured element and said adhesive to obtain a structure of composite material formed by said cured element of said J-shaped cross-section bonded to said precured element.

\* \* \* \* \*